UNITED STATES PATENT OFFICE.

AUGUST BLANK AND MATTHIAS LATTEN, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

DIAZOTIZABLE GREEN AZO DYE.

1,006,051. Specification of Letters Patent. Patented Oct. 17, 1911.

No Drawing. Application filed April 1, 1911. Serial No. 618,396.

*To all whom it may concern:*

Be it known that we, AUGUST BLANK and MATTHIAS LATTEN, doctors of philosophy, chemists, citizens of the German Empire, residing at Leverkusen, near Cologne, Germany, have invented new and useful Improvements in Diazotizable Green Azo Dye, of which the following is a specification.

We have found that para-aminobenzene-azo-1-amino-8-naphthol sulfonic acids, produced *e. g.* by combination of para-nitro-diazobenzene chlorid with 1-amino-8-naphthol sulfonic acids in acid solution and by reduction of the compounds thus produced, or by combination of diazotized acidyl-para-diamins with the said acids and subsequent saponification of the compound thus obtained, can be converted into ureas by treating them with phosgene in the presence of alkalis or of salts acting like alkalis. The new dyes are after being dried and pulverized in the shape of their alkaline salts dark powders soluble in water, yielding upon reduction with stannous chlorid and hydrochloric acid a diamino-naphthol sulfonic acid, a diamin and carbonic acid. The dyestuffs thus obtained dye cotton in brown shades which on being developed on the fiber with diazotized nitranilin, yield green shades of excellent fastness to light and washing which can be readily discharged.

The mixed dyestuffs produced by treating with phosgene, one molecule of one of the above mentioned aminobenzene-azo-1-amino-8-naphthol sulfonic acids and one molecule of any other para-aminobenzene-azo-aryl-sulfonic- or carboxylic acid possess the same qualities.

In order to illustrate the new process more fully the following examples are given, the parts being by weight:

Example 1: 46 parts of the acid sodium salt of para-aminobenzene-azo-amino-8-naphthol-4.6-disulfonic acid, obtained for instance by combining one molecule of para-nitro-diazobenzene chlorid with one molecule of 1-amino-8-naphthol-4.6-disulfonic acid in acid solution and reducing the monoazo dye thus produced with sodium sulfid, are dissolved together with 34.5 parts of sodium carbonate in 3450 parts of hot water. Subsequently a current of phosgene is passed through the solution until the aminoazo compound is completely converted into the urea and the solution after having been stirred until the smell of phosgene has disappeared, is heated to 75° C. and the urea salted out, filtered and pressed.

The formation of the color takes probably place in accordance with the following formula:

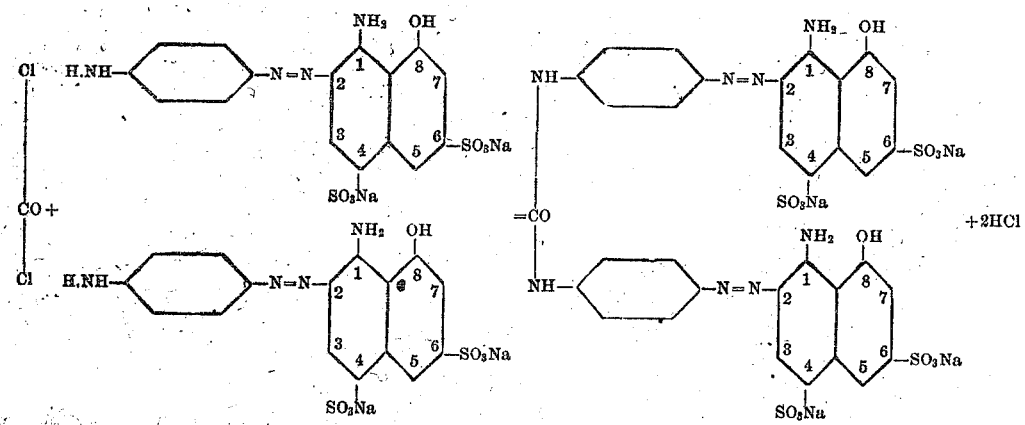

It is after being dried and pulverized in the shape of its sodium salt a dark powder soluble in water with a bluish-red color, soluble in concentrated sulfuric acid with a bluish-violet color; yielding upon reduction with stannous chlorid and hydrochloric acid carbonic acid, para-phenylenediamin and 1.2-diamino-8-naphthol-4.6-disulfonic acid, and dyeing cotton in brown shades which on being developed on the fiber with diazotized nitranilin yield green shades of excellent fastness to light and washing which can be readily discharged.

Example 2: 23 parts of the aminoazo compound obtained by combination of one molecule of para-nitro-benzene-diazo chlorid with one molecule of 1-amino-8-naphthol-3.6-disulfonic acid in acid solution and subsequent reduction of the product thus obtained with sodium sulfid, and 14.4 parts of the sodium salt of para-aminobenzene-azo-salicylic acid are dissolved together in 3450 parts of hot water with the addition of 34.5 parts of sodium carbonate or of the equivalent quantity of a caustic alkali or of sodium acetate and the solution is treated at 50° C. with phosgene until the formation of the urea is complete. The solution is then allowed to cool and the dyestuff is salted out by the addition of 350 parts of salt, filtered, pressed and dried.

The formation of the color takes probably place according to the following formula:

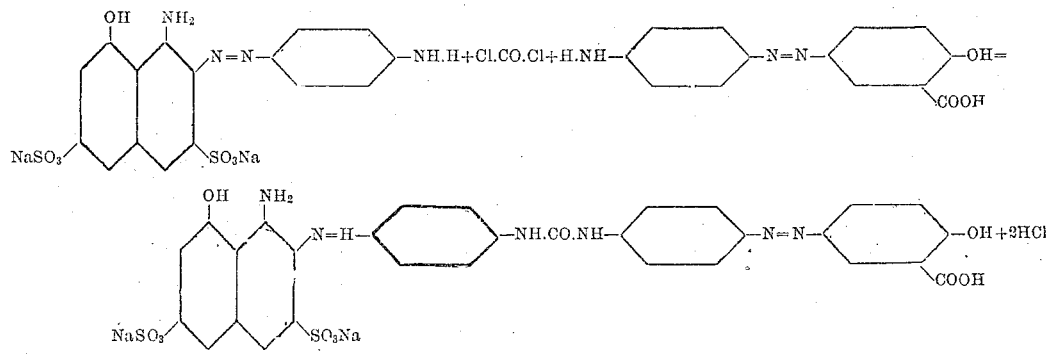

It dyes cotton in red-brown shades changing after combination with diazotized para-nitranilin into a bright green fast to light and washing which can be easily discharged.

Instead of para-aminobenzene-azo-1-amino-8-naphthol disulfonic acids mentioned in the above examples, their homologues or substitution products can be used such as aminotoluene-azo-1-amino-8-naphthol disulfonic acids (produced from ortho-nitro-meta-toluidin or meta-nitro-ortho-toluidin or from the corresponding acidyl toluylenediamins), or the amino compounds obtained by combining the diazo compounds of nitro-cresidin, 3-intro-4-chloro-6-aminoanisol and of nitroaminohydroquinonedialkylether with 1.8-aminonaphthol sulfonic acids and reducing the azo dyes thus produced. The corresponding dyestuffs from aminonaphthol-monosulfonic acids prove equally successful, in this case instead of para-nitranilin, etc., also the sulfonic acids of para-nitranilin or the corresponding acidyl-para-phenylenediamin sulfonic acids can be used.

The para-aminobenzene-azo-salicylic acid mentioned in Example 2 can be replaced by the azo compounds obtained from diazosulfonic or carboxylic acids and anilin, ortho- or meta-toluidin, para-xylidin and cresidin.

We claim:—

1. The herein described new dyestuffs being ureas containing a para-aminobenzene-azo-1.8-aminonaphthol substance, which dyes are after being dried and pulverized in the shape of their alkaline salts dark powders soluble in water, yielding upon reduction with stannous chlorid and hydrochloric acid a diaminonaphthol sulfonic acid, a diamin and carbonic acid; and dyeing cotton brown shades which on being developed on the fiber with diazotized nitranilin yield green shades of excellent fastness to light and washing which can be readily discharged, substantially as described.

2. The herein described new azo dye being the urea of para-aminobenzene-azo-1-amino-8-naphthol-4.6-disulfonic acid, which is after being dried and pulverized in the shape of its sodium salt a dark powder soluble in water with a bluish-red color, soluble in concentrated sulfuric acid with a bluish-violet color; yielding upon reduction with stannous chlorid and hydrochloric acid carbonic acid, para-phenylenediamin and 1.2-diamino-8-naphthol-4.6-disulfonic acid, and dyeing cotton brown shades which on being developed on the fiber with diazotized nitranilin yield green shades of excellent fastness to light and washing which can be readily discharged, substantially as described.

In testimony whereof we have hereunto set our hands in the presence of two subscribing witnesses.

AUGUST BLANK. [L. S.]
MATTHIAS LATTEN. [L. S.]

Witnesses:
CHAS. J. WRIGHT,
ALFRED HENKEL.